(12) United States Patent
Wang et al.

(10) Patent No.: US 11,881,741 B2
(45) Date of Patent: Jan. 23, 2024

(54) EMERGENCY LIGHTING CIRCUIT, EMERGENCY START CONTROL METHOD THEREOF AND EMERGENCY LIGHTING SYSTEM

(71) Applicant: Shenzhen Yihui Lighting Co., Ltd, Shenzhen (CN)

(72) Inventors: Jianwei Wang, Shenzhen (CN); Lin Yang, Shenzhen (CN)

(73) Assignee: Shenzhen Yihui Lighting Co., Ltd, Shenzhen (CN)

( * ) Notice: Subject to any disclaimer, the term of this patent is extended or adjusted under 35 U.S.C. 154(b) by 0 days.

(21) Appl. No.: 17/578,106

(22) Filed: Jan. 18, 2022

(65) Prior Publication Data

US 2023/0050790 A1 Feb. 16, 2023

(30) Foreign Application Priority Data

Aug. 16, 2021 (CN) .......................... 202110938171.9

(51) Int. Cl.
*H02J 9/06* (2006.01)
*H02J 7/00* (2006.01)
*H05B 47/14* (2020.01)

(52) U.S. Cl.
CPC ............ *H02J 9/065* (2013.01); *H02J 7/0048* (2020.01); *H05B 47/14* (2020.01)

(58) Field of Classification Search
CPC .......... H02J 9/065; H02J 7/0048; H05B 47/14
USPC ......................................................... 307/20
See application file for complete search history.

(56) References Cited

U.S. PATENT DOCUMENTS

| 10,568,185 | B1 | 2/2020 | Ostrovsky et al. | |
| 10,701,786 | B2* | 6/2020 | Recker | H02J 9/065 |
| 2016/0308390 | A1* | 10/2016 | Garbowicz | H05B 45/14 |

FOREIGN PATENT DOCUMENTS

| CN | 207766616 U | 8/2018 |
| CN | 111917171 A | 11/2020 |
| EP | 3229557 A1 | 10/2017 |
| JP | 2019215974 A * | 12/2019 |

OTHER PUBLICATIONS

Chinese Patent Office: Office Action of CN 202110938171.9 (related application); dated Aug. 10, 2023; 8 pages.

* cited by examiner

*Primary Examiner* — Thienvu V Tran
*Assistant Examiner* — Sreeya Sreevatsa

(57) ABSTRACT

The present disclosure relates to an emergency lighting circuit, an emergency start control method thereof and an emergency lighting system. When an emergency start condition is met, matching can be performed in a preset dimming database according to type information of load lighting equipment connected to a current emergency lighting circuit to obtain a dimming parameter value matching a power value required by the load lighting equipment, and finally, the load lighting equipment is directly controlled to start with the dimming parameter value. Through the above solution, when emergency lighting is started, there is no need to spend time in regulating power of the load lighting equipment, and a corresponding power value can be ensured when the load lighting equipment is started, which is highly reliable in emergency lighting start.

9 Claims, 6 Drawing Sheets

EMERGENCY LIGHTING CIRCUIT, EMERGENCY START CONTROL METHOD THEREOF AND EMERGENCY LIGHTING SYSTEM

CROSS-REFERENCE TO RELATED APPLICATIONS

This application claims benefit of Chinese Application No. 202110938171.9, filed Aug. 16, 2021, entitled EMERGENCY LIGHTING CIRCUIT, EMERGENCY START CONTROL METHOD THEREOF AND EMERGENCY LIGHTING SYSTEM, the specification of which is incorporated by reference herein in its entirety.

TECHNICAL FIELD

The present disclosure relates to the field of lighting technologies, and in particular, to an emergency lighting circuit, an emergency start control method thereof and an emergency lighting system.

BACKGROUND

Lighting started due to failure of a power source for normal lighting is referred to as emergency lighting. The emergency lighting is an important safety facility in modern public and industrial buildings, which is closely related to personal safety and building safety. When a fire or another disaster occurs in a building and a power failure occurs, the emergency lighting has important influence on personnel evacuation, fire rescue work, continuation of important production and work or necessary operation and disposal.

There are many schemes for emergency lighting at present. When the emergency lighting is started, it generally takes a lot of time to gradually regulate output power of a boost inverter module to enable load lighting equipment to finally operate at required power. Therefore, a conventional emergency lighting system has a disadvantage of poor reliability in emergency lighting start.

SUMMARY

In view of the above, there is a need to provide an emergency lighting circuit, an emergency start control method thereof and an emergency lighting system with respect to the problem that the conventional emergency lighting system has poor reliability in emergency lighting start.

An emergency start control method for an emergency lighting circuit includes: acquiring type information of load lighting equipment when the emergency lighting circuit meets an emergency start condition; performing matching analysis according to the type information and a preset dimming database to obtain a corresponding dimming parameter value, the preset dimming database representing required dimming parameter values corresponding to different load lighting equipment in an emergency operation state; and controlling the load lighting equipment to start according to the dimming parameter value.

In one embodiment, prior to the step of acquiring type information of load lighting equipment when the emergency lighting circuit meets an emergency start condition, the method further includes: detecting, in real time, whether a charging management apparatus of the emergency lighting circuit has electric energy input, the charging management apparatus having no electric energy input indicating that the emergency lighting circuit meets the emergency start condition.

In one embodiment, when the emergency lighting circuit meets the emergency start condition, the method further includes: controlling a power supply switching apparatus of the emergency lighting circuit to switch to powering the load lighting equipment through an emergency battery apparatus of the emergency lighting circuit.

In one embodiment, prior to the step of acquiring type information of load lighting equipment when the emergency lighting circuit meets an emergency start condition, the method further includes: controlling the emergency lighting circuit to actively enter an emergency lighting operation state; and sequentially obtaining and storing dimming parameter values of different load lighting equipment at required power based on an input-terminal power signal of a boost inverter of the emergency lighting circuit, and establishing a dimming database.

In one embodiment, the step of controlling the emergency lighting circuit to actively enter an emergency lighting operation state includes: actively cutting off the electric energy input to the charging management apparatus of the emergency lighting circuit when the emergency battery apparatus of the emergency lighting circuit is detected to reach a preset charging voltage; and controlling the power supply switching apparatus of the emergency lighting circuit to switch to powering the load lighting equipment through the emergency battery apparatus.

In one embodiment, subsequent to the step of controlling the emergency lighting circuit to actively enter an emergency lighting operation state and prior to the step of sequentially obtaining and storing dimming parameter values of different load lighting equipment at required power based on an input-terminal power signal of a boost inverter of the emergency lighting circuit, and establishing a dimming database, the method further includes: controlling a dimming switching apparatus of the emergency lighting circuit to switch to an emergency dimming operation state.

In one embodiment, the step of sequentially obtaining and storing dimming parameter values of different load lighting equipment at required power based on an input-terminal power signal of a boost inverter of the emergency lighting circuit, and establishing a dimming database includes: gradually increasing a dimming signal outputted to the load lighting equipment in an active emergency lighting state; sequentially acquiring the input-terminal power signal of the boost inverter of the emergency lighting circuit under each dimming signal; storing, when the input-terminal power signal reaches preset emergency power, a dimming signal corresponding to the input-terminal power signal as a required dimming parameter value corresponding to current load lighting equipment in an emergency operation state; and establishing the dimming database according to required dimming parameter values corresponding to different load lighting equipment in the emergency operation state.

An emergency lighting circuit includes a charging management apparatus, an emergency battery apparatus, a boost inverter, a power detection apparatus, a power supply switching apparatus and an emergency control apparatus, the charging management apparatus being connected to an external power source, the emergency battery apparatus and the emergency control apparatus being connected to the charging management apparatus, the emergency battery apparatus being connected to an input terminal of the boost inverter and the power detection apparatus, the power detection apparatus being connected to the emergency control apparatus, a control terminal of the boost inverter being connected to the emergency control apparatus, an output terminal of the boost inverter being connected to the power supply switching apparatus, the power supply switching apparatus being connected to the external power source, the emergency control apparatus being connected to the power supply switching apparatus, the power supply switching apparatus being connected to load lighting equipment, and the emergency control apparatus being connected to the load lighting equipment; the emergency control apparatus being configured to perform emergency lighting start control according to the emergency start control method described above.

In one embodiment, the emergency lighting circuit further includes a dimming switching apparatus, the emergency control apparatus is connected to the load lighting equipment through the dimming switching apparatus, and the dimming switching apparatus is connected to an external dimming apparatus.

An emergency lighting system includes load lighting equipment and the emergency lighting circuit described above, the emergency control apparatus being configured to perform emergency lighting start control according to the emergency start control method described above.

According to the emergency lighting circuit, the emergency start control method thereof and the emergency lighting system, when the emergency start condition is met, matching can be performed in a preset dimming database according to type information of load lighting equipment connected to a current emergency lighting circuit to obtain a dimming parameter value matching a power value required by the load lighting equipment, and finally, the load lighting equipment is directly controlled to start with the dimming parameter value. Through the above solution, when emergency lighting is started, there is no need to spend time in regulating power of the load lighting equipment, and a corresponding power value can be ensured when the load lighting equipment is started, which is highly reliable in emergency lighting start.

BRIEF DESCRIPTION OF THE DRAWINGS

In order to more clearly illustrate the technical solutions in embodiments of the present disclosure or the conventional art, the accompanying drawings used in the description of the embodiments or the conventional art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION

Figure 1:
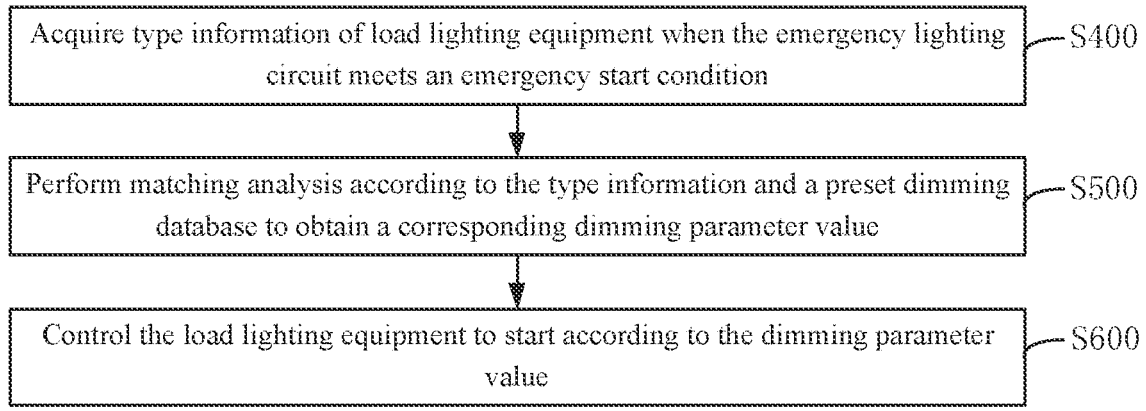
FIG. 1 is a schematic flowchart of an emergency start control method for an emergency lighting circuit according to an embodiment.

To facilitate understanding of the present disclosure, a more comprehensive description of the present disclosure will be given below with reference to the relevant accompanying drawings. Preferred embodiments of the present disclosure are given in the drawings. However, the present disclosure may be implemented in many different forms and is not limited to the embodiments described herein. Rather, these embodiments are provided to make the contents disclosed in the present disclosure more fully understood.

Referring to FIG. 1, an emergency start control method for an emergency lighting circuit includes step S400, step S500 and step S600.

In step S400, type information of load lighting equipment is acquired when the emergency lighting circuit meets an emergency start condition.

Specifically, emergency start means starting a standby power source (which is generally a device that stores energy through an input power source in a normal lighting state) and using the standby power source to supply power to a load connected to the emergency lighting circuit. The type information of the load lighting equipment is not unique. In one embodiment, the type information may be an equipment model of the load lighting equipment. In another embodiment, since the load lighting equipment is started with corresponding power when the emergency lighting is realized, the type information may also directly be power information of the load lighting equipment. That is, in the solution of the present embodiment, an emergency control apparatus of the emergency lighting circuit may perform start control by acquiring the equipment model or power information of the load lighting equipment.

It may be understood that the type information of the load lighting equipment is not acquired in a unique manner, which may be acquired by user input in one embodiment. In other embodiments, the type information may also be obtained by further analysis by collecting image information of the load lighting equipment or operation parameter information in a normal lighting state.

In step S500, matching analysis is performed according to the type information and a preset dimming database to obtain a corresponding dimming parameter value.

Specifically, the preset dimming database represents required dimming parameter values corresponding to different load lighting equipment in an emergency operation state. The emergency control apparatus stores required dimming parameter values corresponding to different types of load lighting equipment. The dimming parameter value corresponds to operating power of the load lighting equipment. The operating power of the load lighting equipment is determined accordingly in a case where the dimming parameter value is determined. After acquiring the type information of the load lighting equipment, the emergency control apparatus directly matches it with the preset dimming database for analysis, to obtain a dimming parameter value corresponding to current load lighting equipment.

In step S600, the load lighting equipment is controlled to start according to the dimming parameter value.

Specifically, after obtaining a dimming parameter value required currently, the emergency control apparatus outputs the dimming parameter value to the load lighting equipment, and the load lighting equipment may be directly started with required power. Through the solution, the load lighting equipment is directly started with the required power in emergency lighting without additionally collecting other parameters in the emergency lighting circuit for regulation, which has an advantage of being highly reliable in start.

Figure 2:
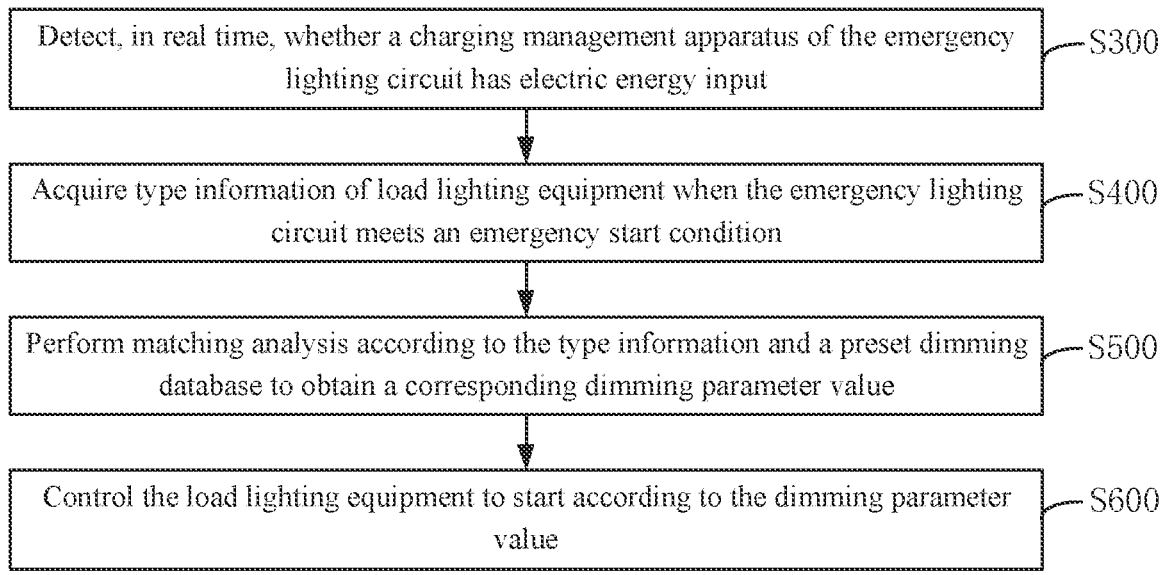
FIG. 2 is a schematic flowchart of an emergency start control method according to another embodiment.

Referring to FIG. 2, in one embodiment, prior to step S400, the method further includes step S300.

In step S300, it is detected, in real time, whether a charging management apparatus of the emergency lighting circuit has electric energy input.

Figure 3:
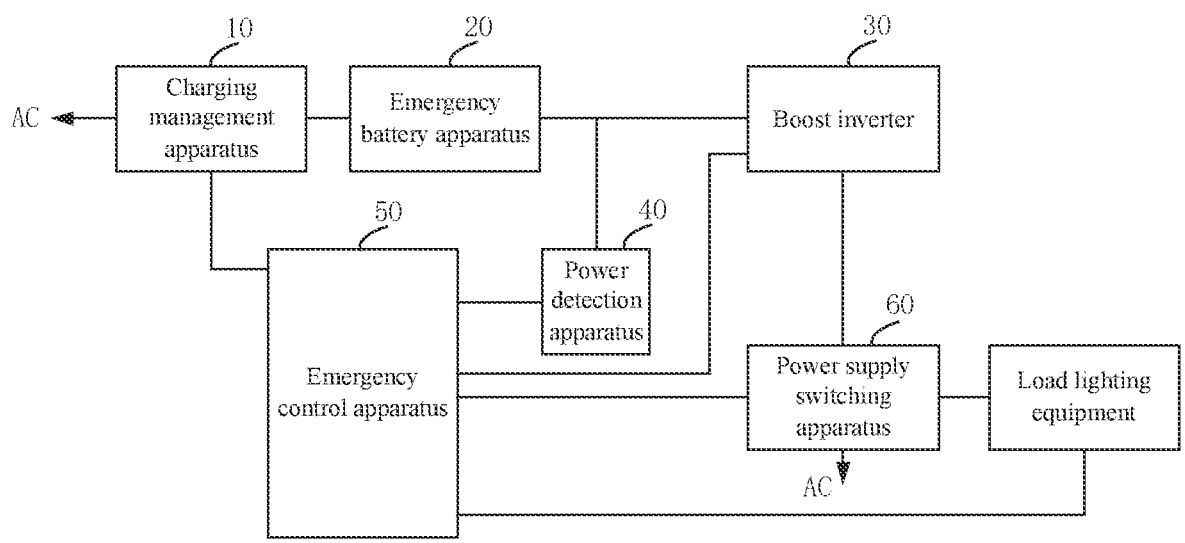
FIG. 3 is a schematic structural diagram of an emergency lighting circuit according to an embodiment.

Specifically, the charging management apparatus having no electric energy input indicates that the emergency lighting circuit meets the emergency start condition. Referring to FIG. 3, an emergency lighting circuit includes a charging management apparatus 10, an emergency battery apparatus 20, a boost inverter 30, a power detection apparatus 40, a power supply switching apparatus 60 and an emergency control apparatus 50. The charging management apparatus 10 is connected to an external power source. The emergency battery apparatus 20 and the emergency control apparatus 50 are connected to the charging management apparatus 10. The emergency battery apparatus 20 is connected to an input terminal of the boost inverter 30 and the power detection apparatus 40. The power detection apparatus 40 is connected to the emergency control apparatus 50. A control terminal of the boost inverter 30 is connected to the emergency control apparatus 50. An output terminal of the boost inverter 30 is connected to the power supply switching apparatus 60. The power supply switching apparatus 60 is connected to the external power source. The emergency control apparatus 50 is connected to the power supply switching apparatus 60. The power supply switching apparatus 60 is connected to load lighting equipment. The emergency control apparatus 50 is connected to the load lighting equipment.

The charging management apparatus 10 is an apparatus that uses an external power source to charge and manage an energy storage device. The external power source is generally an AC power source, and the charging management apparatus 10 generally includes an AC-DC converter (such as a rectifier device), a current-limiting device, a voltage-limiting device, and the like. An AC power source externally inputted may be converted, through the charging management apparatus 10, into a DC power source with a voltage or current required by the energy storage device, so as to charge the energy storage device and ensure charging safety. In the solution of the present embodiment, the emergency lighting circuit is provided with an emergency control apparatus 50. The emergency control apparatus 50 is connected to the charging management apparatus 10, and can collect, in real time, an AC voltage signal inputted to the charging management apparatus 10 or a DC voltage signal into which the AC voltage signal is converted by the charging management apparatus 10, so as to detect whether an external AC power source is normally connected to supply power to the load lighting equipment.

It should be noted that, a specific structure of the charging management apparatus 10 is not unique, provided that it has an AC-DC conversion function as well as current-limiting charging and voltage-limiting charging functions for the energy storage device. For example, in a more detailed embodiment, referring to FIG. 4, the charging management apparatus 10 is connected to the external AC power source, and a fuse is provided at a junction with a live wire of the external AC power source. Then, a rectifier device is connected behind the fuse for AC/DC conversion. Finally, voltage limiting and current limiting charging for a back-end emergency battery apparatus 50 are realized by performing operations such as voltage transformation and current limiting on a DC power source outputted by the rectifier device.

In one embodiment, when the emergency lighting circuit meets the emergency start condition, the method further includes: controlling a power supply switching apparatus of the emergency lighting circuit to switch to powering the load lighting equipment through an emergency battery apparatus of the emergency lighting circuit.

Specifically, when the emergency lighting circuit meets the emergency start condition, that is, the charging management apparatus 10 has no electric energy input, the power supply switching apparatus 60 of the emergency lighting circuit is controlled to switch to powering the load lighting equipment through the emergency battery apparatus 20 of the emergency lighting circuit. When it is detected that the charging management apparatus 10 has no electric energy input, it indicates that the external power source cannot normally supply power to the load lighting equipment. In this case, the emergency control apparatus 50 may switch a power supply line through the power supply switching apparatus 60, which switches a line originally powering the load lighting equipment directly from the external power source to powering the load lighting equipment through electric energy stored in the emergency battery apparatus 20.

It should be noted that a specific type of the power supply switching apparatus 60 is not unique. In one embodiment, referring to FIG. 4, the power supply switching apparatus 60 is specifically a switch apparatus. In case of power supply switching, a power supply line switching operation can be realized only when the emergency control apparatus 50 controls a switch device corresponding to the emergency battery apparatus 20 to be turned on or controls a switch device corresponding to the external power source to be turned on. A specific type of the switch device is not unique, which may be a triode, a relay, or the like, provided that a switch function can be realized under the control of the emergency control apparatus 50.

Figure 5:
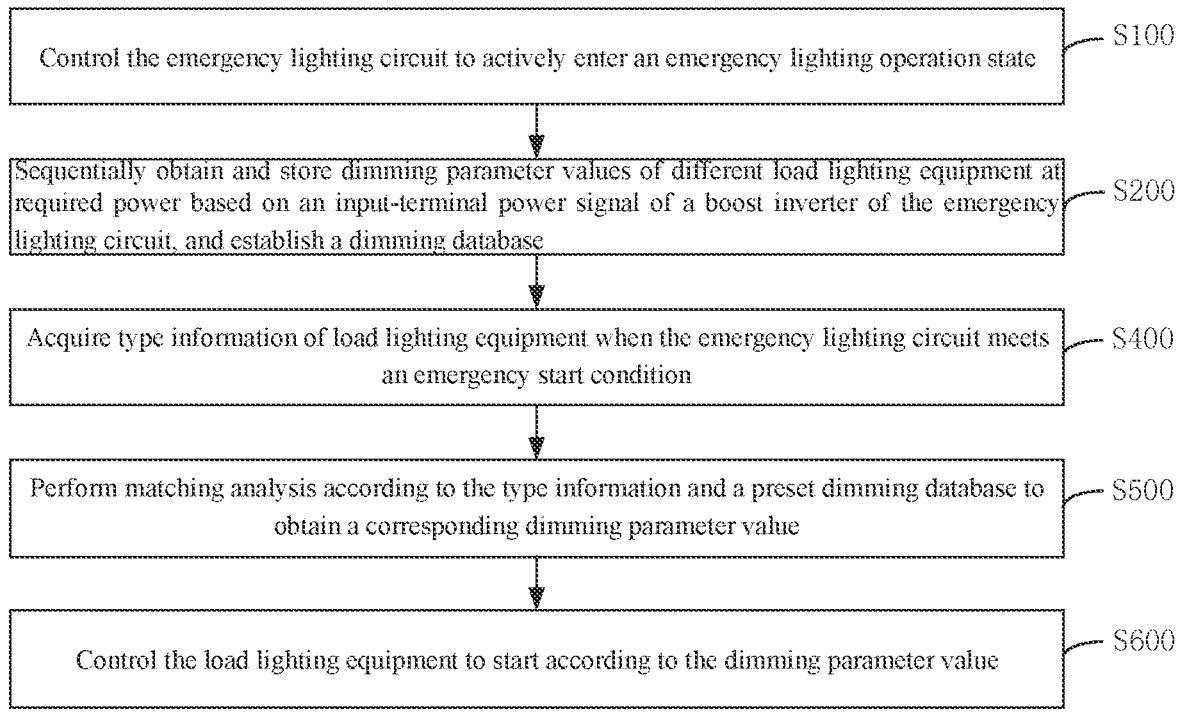
FIG. 5 is a schematic flowchart of an emergency start control method according to yet another embodiment.

Referring to FIG. 5, prior to step S400, the method further includes step S100 and step S200.

In step S100, the emergency lighting circuit is controlled to actively enter an emergency lighting operation state. In step S200, dimming parameter values of different load lighting equipment at required power are sequentially obtained and stored based on an input-terminal power signal of a boost inverter of the emergency lighting circuit, and a dimming database is established.

Specifically, the emergency lighting circuit builds the dimming database according to experimental analysis, stores the dimming database in the emergency control apparatus 50, and directly calls a corresponding dimming parameter value from the emergency control apparatus 50 in subsequent emergency lighting, and the operation of controlling the load lighting equipment to start with required power can be realized. The emergency lighting circuit actively entering an emergency lighting operation state means that the emergency lighting circuit is switched from a normal lighting state to an emergency lighting state when not meeting the emergency start condition.

After the emergency lighting state is actively entered, the emergency control apparatus 50 establishes, according to different load lighting equipment connected and required dimming parameter values corresponding to the different load lighting equipment when started according to the required power and obtained from testing, a mapping relationship between type information and dimming parameter values of the load lighting equipment, and the dimming database can be obtained.

Further, when the load lighting equipment is connected to test the required dimming parameter, the emergency control apparatus 50 collects the input-terminal power signal of the boost inverter 30 and obtains, according to variation value of the input-terminal power signal, a dimming parameter value finally required.

Figure 6:
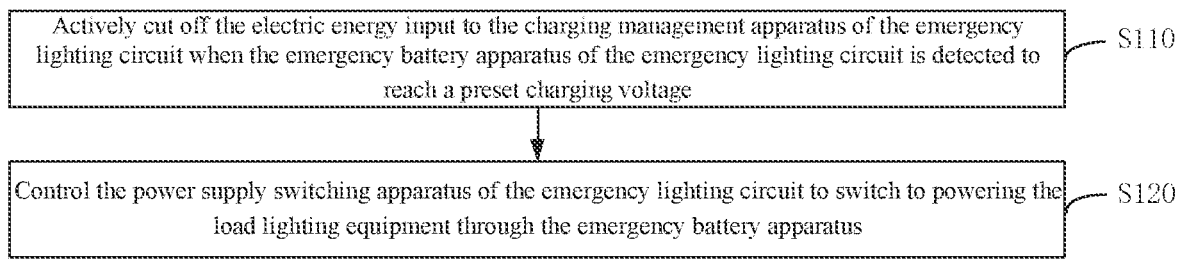
FIG. 6 is a schematic flowchart of active emergency control according to an embodiment.

Referring to FIG. 6, in one embodiment, step S100 includes step S110 and step S120.

In step S110, the electric energy input to the charging management apparatus of the emergency lighting circuit is actively cut off when the emergency battery apparatus of the emergency lighting circuit is detected to reach a preset charging voltage. In step S120, the power supply switching apparatus of the emergency lighting circuit is controlled to switch to powering the load lighting equipment through the emergency battery apparatus.

Specifically, during normal lighting, the external power source may perform voltage-limiting and current-limiting charging on the emergency battery apparatus 20 through the charging management apparatus 10. The emergency control apparatus 50 detects the electric energy stored by the emergency battery apparatus 20 in real time. When the emergency battery apparatus 20 reaches a preset charging voltage, it indicates that a current storage voltage of the emergency battery apparatus 20 is enough to support the emergency lighting circuit to enter the emergency lighting state and realize the establishment of the dimming database. In this case, the emergency control apparatus 50 may cut off the electric energy input to the charging management apparatus 10 of the emergency lighting circuit, that is, an input terminal of the power supply switching apparatus 60 is controlled to be disconnected from the external power source. At the same time, a power supply line is switched, so that the emergency battery apparatus 20 and the boost inverter 30 are connected to the circuit to realize emergency power supply.

Figure 7:
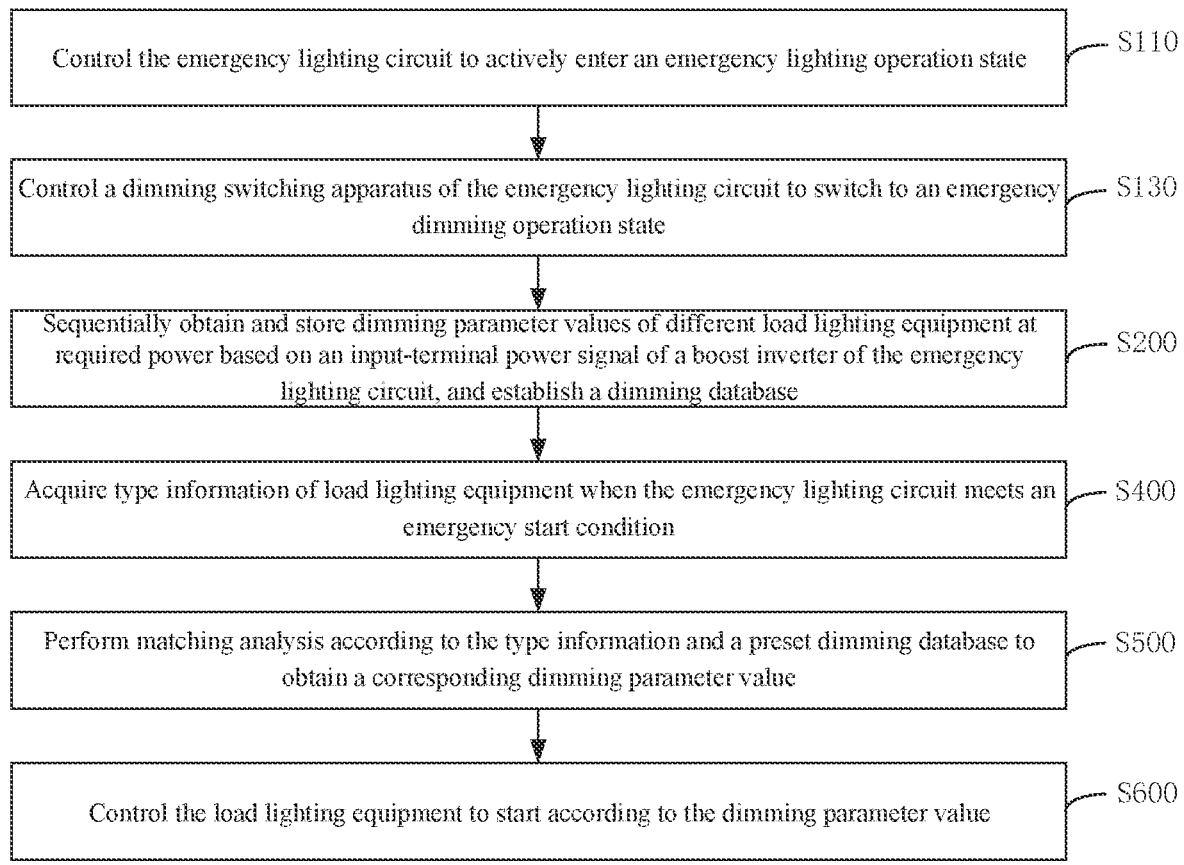
FIG. 7 is a schematic flowchart of an emergency start control method according to still another embodiment.

Further, referring to FIG. 7, in one embodiment, subsequent to step S100 and prior to step S200, the method further includes step S130.

In step S130, a dimming switching apparatus of the emergency lighting circuit is controlled to switch to an emergency dimming operation state.

Specifically, the emergency lighting circuit further includes a dimming switching apparatus, the emergency control apparatus 50 is connected to the load lighting equipment through the dimming switching apparatus, and the dimming switching apparatus is connected to an external dimming apparatus. Through the dimming switching apparatus, an external dimming operation may be cut off in the emergency lighting state, and dimming is performed through the emergency control apparatus 50; that is, emergency dimming operation is realized. In the normal lighting state, an external dimming function is switched on, and the load lighting equipment is regulated, based on a dimming signal inputted by a user through the external dimming apparatus, to required power to operate.

Further, in one embodiment, the operation of controlling a dimming switching apparatus of the emergency lighting circuit to switch to an emergency dimming operation state further includes disconnecting the external dimming apparatus from the load lighting equipment. That is, in the embodiment, in the emergency lighting state, the power of the load lighting equipment can be regulated only through the emergency control apparatus 50, and the user cannot regulate it according to his/her own need, thereby ensuring operation stability of the emergency lighting state. It may be understood that, in another embodiment, the external dimming apparatus may not be disconnected from the load lighting equipment, so that the power can be regulated correspondingly according to a user need even if in the emergency lighting state.

Figure 4:
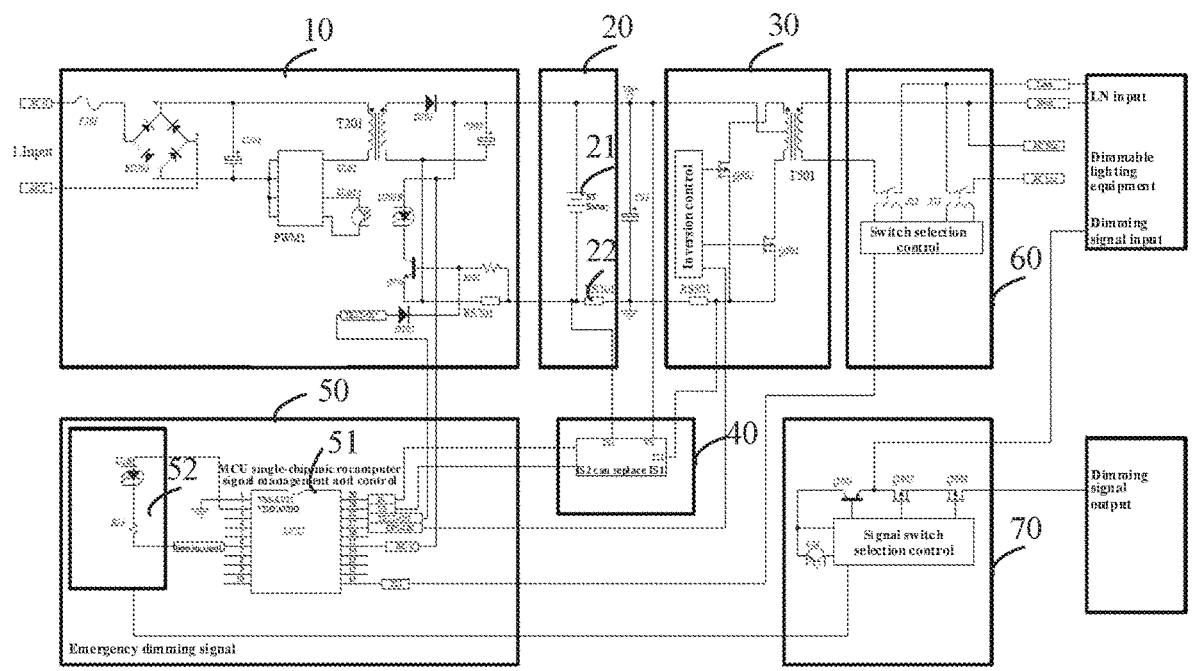
FIG. 4 is a schematic structural diagram of an emergency lighting circuit according to another embodiment.

It should be noted that, a specific type of the dimming switching apparatus is not unique. Referring to FIG. 4, in one embodiment, similar to the power supply switching apparatus 60, the dimming switching apparatus may also be a switch apparatus. When a dimming manner is switched, the emergency control apparatus 50 is required only to control a switch device corresponding to a dimming channel to be turned on. A specific type of the switch device is not unique, which may be a triode, a relay, or the like, provided that a switch function can be realized under the control of the emergency control apparatus 50.

Figure 8:
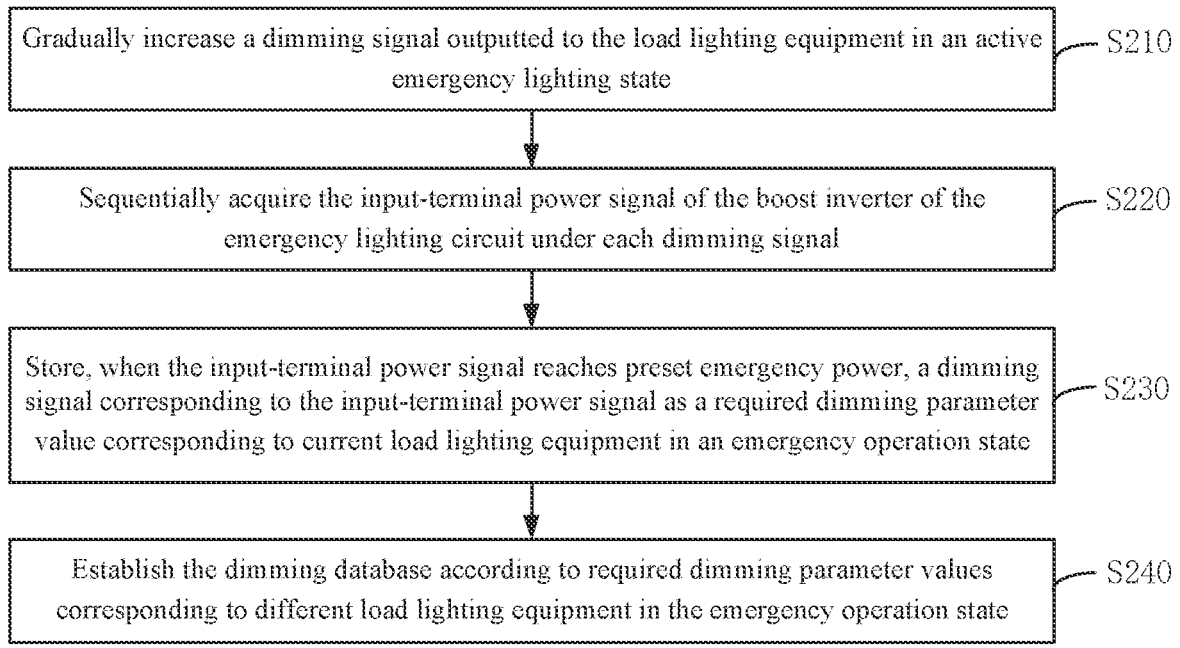
FIG. 8 is a schematic flowchart of establishment of a dimming database according to an embodiment.

Referring to FIG. 8, in one embodiment, step S200 includes step S210, step S220, step S230 and step S240.

In step S210, a dimming signal outputted to the load lighting equipment is gradually increased in an active emergency lighting state. In step S220, the input-terminal power signal of the boost inverter of the emergency lighting circuit is sequentially acquired under each dimming signal. In step S230, when the input-terminal power signal reaches preset emergency power, a dimming signal corresponding to the input-terminal power signal is stored as a required dimming parameter value corresponding to current load lighting equipment in an emergency operation state. In step S240, the dimming database is established according to required dimming parameter values corresponding to different load lighting equipment in the emergency operation state.

Specifically, the emergency control apparatus 50 includes an emergency dimmer and a processor (which may specifically be a single-chip microcomputer or a microcontroller unit). The processor is connected to the emergency dimmer. The emergency dimmer and the processor are connected to the dimming switching apparatus. The charging management apparatus 10, the power supply switching apparatus 60 and the input terminal and the control terminal of the boost inverter 30 are connected to the processor. After the emergency lighting state is actively entered, under the control of the processor, the dimming switching apparatus connects the emergency dimmer to the load lighting equipment. In this case, the dimming signal of the dimmer may be gradually increased (which may specifically be gradually increased from a minimum dimming signal) for testing. Under each dimming signal, the processor may obtain the input-terminal power signal of the boost inverter 30 by collection through the power detection apparatus 40. At the same time, the power signal is compared and analyzed with preset emergency power. When the dimming signal is regulated to enable the input-terminal power signal to reach the preset emergency power, a current dimming signal is recorded as a dimming parameter value corresponding to power required by the load lighting equipment. When the load lighting equipment is switched, a similar measurement method is adopted to sequentially obtain dimming parameter values of different load lighting equipment, a mapping relationship is finally established and stored, and the dimming database can be obtained.

According to the emergency start control method for an emergency lighting circuit, when the emergency start condition is met, matching can be performed in a preset dimming database according to type information of load lighting equipment connected to a current emergency lighting circuit to obtain a dimming parameter value matching a power value required by the load lighting equipment, and finally, the load lighting equipment is directly controlled to start with the dimming parameter value. Through the above solution, when emergency lighting is started, there is no need to spend time in regulating power of the load lighting equipment, and a corresponding power value can be ensured when the load lighting equipment is started, which is highly reliable in emergency lighting start.

Referring to FIG. 3, an emergency lighting circuit includes a charging management apparatus 10, an emergency battery apparatus 20, a boost inverter 30, a power detection apparatus 40, a power supply switching apparatus 60 and an emergency control apparatus 50. The charging management apparatus 10 is connected to an external power source. The emergency battery apparatus 20 and the emergency control apparatus 50 are connected to the charging management apparatus 10. The emergency battery apparatus 20 is connected to an input terminal of the boost inverter 30 and the power detection apparatus 40. The power detection apparatus 40 is connected to the emergency control apparatus 50. A control terminal of the boost inverter 30 is connected to the emergency control apparatus 50. An output terminal of the boost inverter 30 is connected to the power supply switching apparatus 60. The power supply switching apparatus 60 is connected to the external power source. The emergency control apparatus 50 is connected to the power supply switching apparatus 60. The power supply switching apparatus 60 is connected to load lighting equipment. The emergency control apparatus 50 is connected to the load lighting equipment. The emergency control apparatus 50 is configured to perform emergency lighting start control according to the emergency start control method described above.

Specifically, emergency start means starting a standby power source (which is generally a device that stores energy through an input power source in a normal lighting state) and using the standby power source to supply power to a load connected to the emergency lighting circuit. The type information of the load lighting equipment is not unique. In one embodiment, the type information may be an equipment model of the load lighting equipment. In another embodiment, since the load lighting equipment is started with corresponding power when the emergency lighting is realized, the type information may also directly be power information of the load lighting equipment. That is, in the solution of the present embodiment, the emergency control apparatus 50 of the emergency lighting circuit may perform start control by acquiring the equipment model or power information of the load lighting equipment.

The preset dimming database represents required dimming parameter values corresponding to different load lighting equipment in an emergency operation state. The emergency control apparatus 50 stores required dimming parameter values corresponding to different types of load lighting equipment. The dimming parameter value corresponds to operating power of the load lighting equipment. The operating power of the load lighting equipment is determined accordingly in a case where the dimming parameter value is determined. After acquiring the type information of the load lighting equipment, the emergency control apparatus 50 directly matches it with the preset dimming database for analysis, to obtain a dimming parameter value corresponding to current load lighting equipment.

Specifically, after obtaining a dimming parameter value required currently, the emergency control apparatus 50 outputs the dimming parameter value to the load lighting equipment, and the load lighting equipment may be directly started with required power. Through the solution, the load lighting equipment is directly started with the required power in emergency lighting without additionally collecting other parameters in the emergency lighting circuit for regulation, which has an advantage of being highly reliable in start.

The charging management apparatus 10 is an apparatus that uses an external power source to charge and manage an energy storage device. The external power source is generally an AC power source, and the charging management apparatus 10 generally includes an AC-DC converter (such as a rectifier device), a current-limiting device, a voltage-limiting device, and the like. An AC power source externally inputted may be converted, through the charging management apparatus 10, into a DC power source with a voltage or current required by the energy storage device, so as to charge the energy storage device and ensure charging safety. In the solution of the present embodiment, the emergency lighting circuit is provided with an emergency control apparatus 50. The emergency control apparatus 50 is connected to the charging management apparatus 10, and can collect, in real time, an AC voltage signal inputted to the charging management apparatus 10 or a DC voltage signal into which the AC voltage signal is converted by the charging management apparatus 10, so as to detect whether an external AC power source is normally connected to supply power to the load lighting equipment.

A specific structure of the charging management apparatus 10 is not unique, provided that it has an AC-DC conversion function as well as current-limiting charging and voltage-limiting charging functions for the energy storage device. For example, in a more detailed embodiment, referring to FIG. 4, the charging management apparatus 10 is connected to the external AC power source, and a fuse is provided at a junction with a live wire of the external AC power source. Then, a rectifier device is connected behind the fuse for AC/DC conversion. Finally, voltage limiting and current limiting charging for a back-end emergency battery apparatus 50 are realized by performing operations such as voltage transformation and current limiting on a DC power source outputted by the rectifier device.

When the emergency lighting circuit meets the emergency start condition, that is, the charging management apparatus 10 has no electric energy input, the power supply switching apparatus 60 of the emergency lighting circuit is controlled to switch to powering the load lighting equipment through the emergency battery apparatus 20 of the emergency lighting circuit. When it is detected that the charging management apparatus 10 has no electric energy input, it indicates that the external power source cannot normally supply power to the load lighting equipment. In this case, the emergency control apparatus 50 may switch a power supply line through the power supply switching apparatus 60, which switches a line originally powering the load lighting equipment directly from the external power source to powering the load lighting equipment through electric energy stored in the emergency battery apparatus 20.

It should be noted that a specific type of the power supply switching apparatus 60 is not unique. In one embodiment, referring to FIG. 4, the power supply switching apparatus 60 is specifically a switch apparatus. In case of power supply switching, a power supply line switching operation can be realized only when the emergency control apparatus 50 controls a switch device corresponding to the emergency battery apparatus 20 to be turned on or controls a switch device corresponding to the external power source to be turned on. A specific type of the switch device is not unique, which may be a triode, a relay, or the like, provided that a switch function can be realized under the control of the emergency control apparatus 50.

After the emergency lighting state is entered, the electric energy stored in the emergency charging apparatus may be released, and originally stored low-voltage DC electricity is converted into electric energy with a higher voltage through boost and inversion functions of the boost inverter 30, so as to realize an operation of powering the load lighting equipment. At the same time, a power detection apparatus 40 is further arranged between the input terminal of the boost inverter 30 and output of the emergency battery apparatus 20. When emergency lighting is started, the power apparatus can detect an input-terminal power signal at the input terminal of the boost inverter 30 in real time, and then output a corresponding dimming signal to the load lighting equipment in combination with the input-terminal power signal, so as to regulate the load lighting equipment to corresponding power for operation.

Similarly, a specific structure of the boost inverter 30 is not unique. In one embodiment, referring to FIG. 4, the boost inverter 30 may include two parts, i.e., an inverter and a boost transformer. The inverter is connected to the emergency battery apparatus 20. The boost transformer is connected to the inverter and the power supply switching apparatus 60. Therefore, after DC electricity outputted by the corresponding emergency battery apparatus 20 is inverted and boosted, high-voltage electric energy is provided for the load lighting equipment.

Figure 9:
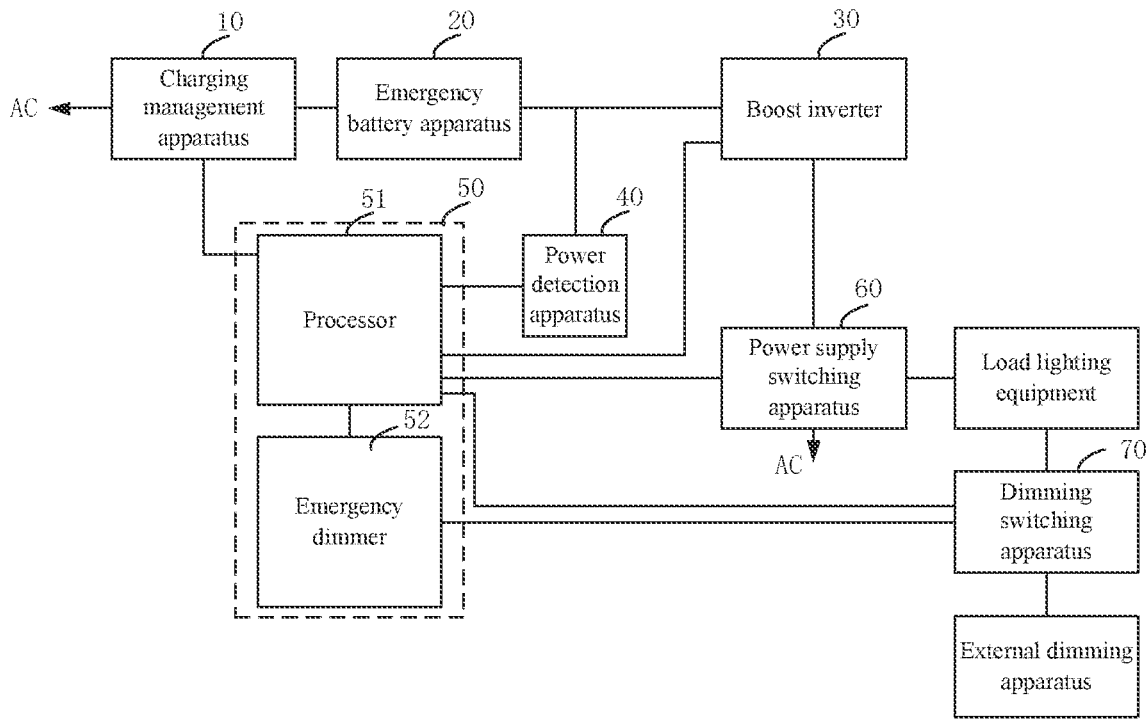
FIG. 9 is a schematic structural diagram of an emergency lighting circuit according to yet another embodiment.

Referring to FIG. 9, in one embodiment, the emergency lighting circuit further includes a dimming switching apparatus 70, the emergency control apparatus 50 is connected to the load lighting equipment through the dimming switching apparatus 70, and the dimming switching apparatus 70 is connected to an external dimming apparatus.

Specifically, the external dimming operation may be cut off in the emergency lighting state through the dimming switching apparatus 70. In the normal lighting state, an external dimming function is switched on, and the load lighting equipment is regulated, based on a dimming signal inputted by a user through the external dimming apparatus, to required power to operate.

Further, in one embodiment, the operation of controlling a dimming switching apparatus 70 of the emergency lighting circuit to switch to an emergency dimming operation state further includes disconnecting the external dimming apparatus from the load lighting equipment. That is, in the embodiment, in the emergency lighting state, the power of the load lighting equipment can be regulated only through the emergency control apparatus 50, and the user cannot regulate it according to his/her own need, thereby ensuring operation stability of the emergency lighting state. It may be understood that, in another embodiment, the external dimming apparatus may not be disconnected from the load lighting equipment, so that the power can be regulated correspondingly according to a user need even if in the emergency lighting state.

It should be noted that, a specific type of the dimming switching apparatus 70 is not unique. Referring to FIG. 4, in one embodiment, similar to the power supply switching apparatus 60, the dimming switching apparatus 70 may also be a switch apparatus. When a dimming manner is switched, the emergency control apparatus 50 is required only to control a switch device corresponding to a dimming channel to be turned on. A specific type of the switch device is not unique, which may be a triode, a relay, or the like, provided that a switch function can be realized under the control of the emergency control apparatus 50.

Referring to FIG. 4, in one embodiment, the emergency battery apparatus 20 includes a battery and a sampling resistor, a first terminal of the battery is connected to the charging management apparatus 10 and the boost inverter 30, a second terminal of the battery is connected to a first terminal of the sampling resistor, the charging management apparatus 10 and the power detection apparatus 40, and a second terminal of the sampling resistor is connected to the boost inverter 30.

Specifically, in the solution of the present embodiment, when the input-terminal power signal of the boost inverter 30 is acquired, only a voltage and a current are sampled through the sampling resistor to obtain the input-terminal voltage signal and the input-terminal current signal of the boost inverter 30, and then the input-terminal power signal of the boost inverter 30 can be directly calculated.

It may be understood that, in other embodiments, the input-terminal power signal of the boost inverter 30 may also be obtained in other manners. For example, the input-terminal power signal is obtained directly through a transformer, a power sampling chip or the like.

Referring to FIG. 9, in one embodiment, the emergency control apparatus 50 includes an emergency dimmer 52 and a processor 51. The processor 51 is connected to the emergency dimmer 52. The emergency dimmer 52 and the processor 51 are connected to the dimming switching apparatus 70. The charging management apparatus 10, the power supply switching apparatus 60 and the input terminal and the control terminal of the boost inverter 30 are connected to the processor 51.

Specifically, in the embodiment, after the emergency lighting circuit is controlled to enter the emergency lighting state, the processor 51 may also switch the dimming switching apparatus 70 before the operating power of the load lighting equipment is regulated based on the input-terminal power signal of the boost inverter 30, so that the emergency dimmer 52 is connected to the load lighting equipment through the dimming switching apparatus 70, and the power of the load lighting equipment is automatically regulated through the emergency dimmer 52.

It may be understood that, in one embodiment, the processor 51 can also control the dimming switching apparatus 70 to realize dimming switching while the emergency dimmer 52 automatically regulates the power of the load lighting equipment. In one embodiment, the dimming switching operation of the dimming switching apparatus 70 may be realized by the emergency dimmer 52 and the processor 51 in parallel or realized only by one of the emergency dimmer 52 and the processor 51.

According to the emergency lighting circuit, when the emergency start condition is met, matching can be performed in a preset dimming database according to type information of load lighting equipment connected to a current emergency lighting circuit to obtain a dimming parameter value matching a power value required by the load lighting equipment, and finally, the load lighting equipment is directly controlled to start with the dimming parameter value. Through the above solution, when emergency lighting is started, there is no need to spend time in regulating power of the load lighting equipment, and a corresponding power value can be ensured when the load lighting equipment is started, which is highly reliable in emergency lighting start.

An emergency lighting system includes load lighting equipment and the emergency lighting circuit described above. The emergency control apparatus 50 is configured to perform emergency lighting start control according to the emergency start control method described above.

Specifically, the specific structure of the emergency lighting circuit is as illustrated by the above embodiments and the drawings. Emergency start means starting a standby power source (which is generally a device that stores energy through an input power source in a normal lighting state) and using the standby power source to supply power to a load connected to the emergency lighting circuit. The type information of the load lighting equipment is not unique. In one embodiment, the type information may be an equipment model of the load lighting equipment. In another embodiment, since the load lighting equipment is started with corresponding power when the emergency lighting is realized, the type information may also directly be power information of the load lighting equipment. That is, in the solution of the present embodiment, the emergency control apparatus 50 of the emergency lighting circuit may perform start control by acquiring the equipment model or power information of the load lighting equipment.

The preset dimming database represents required dimming parameter values corresponding to different load lighting equipment in an emergency operation state. The emergency control apparatus 50 stores required dimming parameter values corresponding to different types of load lighting equipment. The dimming parameter value corresponds to operating power of the load lighting equipment. The operating power of the load lighting equipment is determined accordingly in a case where the dimming parameter value is determined. After acquiring the type information of the load lighting equipment, the emergency control apparatus 50 directly matches it with the preset dimming database for analysis, to obtain a dimming parameter value corresponding to current load lighting equipment.

Specifically, after obtaining a dimming parameter value required currently, the emergency control apparatus 50 outputs the dimming parameter value to the load lighting equipment, and the load lighting equipment may be directly started with required power. Through the solution, the load lighting equipment is directly started with the required power in emergency lighting without additionally collecting other parameters in the emergency lighting circuit for regulation, which has an advantage of being highly reliable in start.

According to the emergency lighting system, when the emergency start condition is met, matching can be performed in a preset dimming database according to type information of load lighting equipment connected to a current emergency lighting circuit to obtain a dimming parameter value matching a power value required by the load lighting equipment, and finally, the load lighting equipment is directly controlled to start with the dimming parameter value. Through the above solution, when emergency lighting is started, there is no need to spend time in regulating power of the load lighting equipment, and a corresponding power value can be ensured when the load lighting equipment is started, which is highly reliable in emergency lighting start.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. An emergency start control method for an emergency lighting circuit, comprising:
   controlling the emergency lighting circuit to actively enter an emergency lighting operation state;
   sequentially obtaining and storing dimming parameter values of load lighting equipment at required power based on an input-terminal power signal of a boost inverter of the emergency lighting circuit, and establishing a dimming database;
   acquiring type information of the load lighting equipment when the emergency lighting circuit meets an emergency start condition;
   performing matching analysis according to the type information and a preset dimming database to obtain a corresponding dimming parameter value, the preset dimming database representing required dimming parameter values corresponding to the load lighting equipment in an emergency operation state;
   controlling the load lighting equipment to start according to the dimming parameter value.

2. The emergency start control method according to claim 1, further comprising: prior to the step of acquiring type information of the load lighting equipment when the emergency lighting circuit meets the emergency start condition,
   detecting, in real time, whether a charging management apparatus of the emergency lighting circuit has electric energy input, the charging management apparatus having no electric energy input indicating that the emergency lighting circuit meets the emergency start condition.

3. The emergency start control method according to claim 1, further comprising:
   when the emergency lighting circuit meets the emergency start condition, controlling a power supply switching apparatus of the emergency lighting circuit to switch to powering the load lighting equipment through an emergency battery apparatus of the emergency lighting circuit.

4. The emergency start control method according to claim 1, wherein the step of controlling the emergency lighting circuit to actively enter an emergency lighting operation state comprises:
   actively cutting off electric energy input to a charging management apparatus of the emergency lighting circuit when an emergency battery apparatus of the emergency lighting circuit is detected to reach a preset charging voltage;
   controlling a power supply switching apparatus of the emergency lighting circuit to switch to powering the load lighting equipment through the emergency battery apparatus.

5. The emergency start control method according to claim 1, further comprising: subsequent to the step of controlling the emergency lighting circuit to actively enter an emergency lighting operation state and prior to the step of sequentially obtaining and storing dimming parameter values of the load lighting equipment at required power based on an input-terminal power signal of a boost inverter of the emergency lighting circuit, and establishing a dimming database, controlling a dimming switching apparatus of the emergency lighting circuit to switch to an emergency dimming operation state.

6. The emergency start control method according to claim 1, wherein the step of sequentially obtaining and storing dimming parameter values of the load lighting equipment at required power based on an input-terminal power signal of a boost inverter of the emergency lighting circuit, and establishing a dimming database comprises:

gradually increasing a dimming signal outputted to the load lighting equipment in an active emergency lighting state;

sequentially acquiring the input-terminal power signal of the boost inverter of the emergency lighting circuit under each dimming signal;

storing, when the input-terminal power signal reaches preset emergency power, a dimming signal corresponding to the input-terminal power signal as a required dimming parameter value corresponding to the load lighting equipment in an emergency operation state;

establishing the dimming database according to required dimming parameter values corresponding to the load lighting equipment in the emergency operation state.

7. An emergency lighting circuit, comprising a charging management apparatus, an emergency battery apparatus, a boost inverter, a power detection apparatus, a power supply switching apparatus and an emergency control apparatus, the charging management apparatus being connected to an external power source, the emergency battery apparatus and the emergency control apparatus being connected to the charging management apparatus, the emergency battery apparatus being connected to an input terminal of the boost inverter and the power detection apparatus, the power detection apparatus being connected to the emergency control apparatus, a control terminal of the boost inverter being connected to the emergency control apparatus, an output terminal of the boost inverter being connected to the power supply switching apparatus, the power supply switching apparatus being connected to the external power source, the emergency control apparatus being connected to the power supply switching apparatus, the power supply switching apparatus being connected to load lighting equipment, and the emergency control apparatus being connected to the load lighting equipment; the emergency control apparatus being configured to perform emergency lighting start control with the emergency start control method according to claim 1.

8. The emergency lighting circuit according to claim 7, further comprising a dimming switching apparatus, the emergency control apparatus is connected to the load lighting equipment through the dimming switching apparatus, and the dimming switching apparatus is connected to an external dimming apparatus.

9. An emergency lighting system, comprising load lighting equipment and an emergency lighting circuit, the emergency lighting circuit comprising a charging management apparatus, an emergency battery apparatus, a boost inverter, a power detection apparatus, a power supply switching apparatus and an emergency control apparatus, the charging management apparatus being connected to an external power source, the emergency battery apparatus and the emergency control apparatus being connected to the charging management apparatus, the emergency battery apparatus being connected to an input terminal of the boost inverter and the power detection apparatus, the power detection apparatus being connected to the emergency control apparatus, a control terminal of the boost inverter being connected to the emergency control apparatus, an output terminal of the boost inverter being connected to the power supply switching apparatus, the power supply switching apparatus being connected to the external power source, the emergency control apparatus being connected to the power supply switching apparatus, the power supply switching apparatus being connected to the load lighting equipment, and the emergency control apparatus being configured to perform emergency lighting start control with the emergency start control method according to claim 1.

\* \* \* \* \*